J. King, Jr.,
Fish Hook.
No. 59,844.      Patented Nov. 20, 1866.
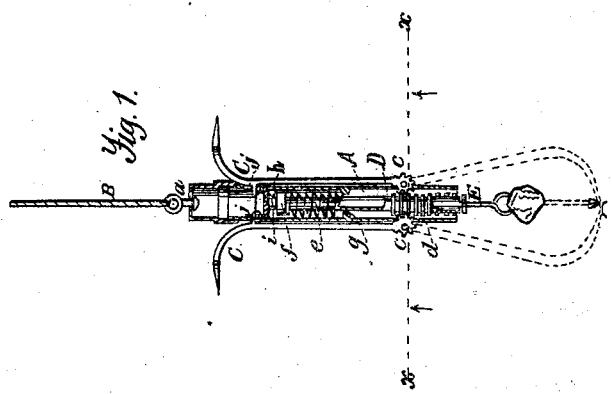
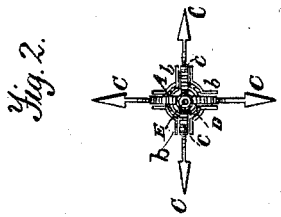
Witnesses.
F. A. Jackson
Theo. Fisch.
Inventor.
Jacob King Jr
Per Munn & Co
Attorneys.

United States Patent Office.

IMPROVEMENT IN SPRING FISH-HOOKS.

JACOB KING, JR., OF FORT WAYNE, INDIANA.

Letters Patent No. 59,844, dated November 20, 1866.

SPECIFICATION.

TO ALL WHOM IT MAY CONCERN:

Be it known that I, JACOB KING, Jr., of Fort Wayne, in the county of Allen, and State of Indiana, have invented a new and improved Fish-Hook and Trap; and I do hereby declare that the following is a full, clear, and exact description thereof, which will enable others skilled in the art to make and use the same, reference being had to the accompanying drawings forming a part of this specification, in which—

Figure 1 is a side sectional view of my invention.

Figure 2 is a horizontal section of the same, taken in the line $x\ x$, fig. 1.

Similar letters of reference indicate like parts.

This invention relates to a new and useful device which may be used for catching fish, or used as a trap for catching various animals, such as rats, mice, and game.

The invention consists in having a series of hooks arranged or applied to a tube and connected with a rod and springs in such a manner that when the device is baited and set, and a fish or animal seizes the bait, the hooks will be freed and forced down by the springs, so as to catch or seize the fish or animal and hold it securely.

A represents a tube, to one end of which a swivel eye, $a$, is attached, in which eye the line B is fastened. On the exterior of the tube A, near its lower end, there are four ears or lugs, $b$, in which the inner ends of hooks, C, are pivoted, said hooks having each a small pinion, $c$, at its inner end, said pinions being fitted within the ears or lugs, and allowed to turn freely therein.

Within this tube, A, there is fitted another tube, D, the latter being allowed to slide freely within the former, and having on its lower part a rack, $d$, in which the pinions $c$ gear, as shown clearly in fig. 1; and, on the upper part of said tube D, there is fitted a spiral spring, $e$, the upper end of which bears against a collar, $f$, on the tube D, and the lower end against a collar or shoulder, $g$, on the interior of a tube A. E represents a rod, which passes loosely through the tube D, and has a disk, $h$, on its upper end, the upper surface of said disk being hollowed out to form a cup. On the upper part of this rod, E, between the collar $f$ of tube D and the disk $h$, there is placed a small spiral spring, $i$. In the tube A there are made, at opposite points, two openings to allow catches, $j\ j$, on two of the hooks C, to pass through, and the disk $h$, in consequence of being pressed upward by the spring $i$, allows the catches $j\ j$ to engage with it, said disk keeping the hooks C in an elevated state, and the spring $e$ in a compressed state.

When the hooks C are thus elevated, the device is what is commonly termed "set," the bait being secured to the lower end of the rod E.

The hooks C are set by simply turning up the two hooks which have the catches $j$ attached, and pressing said catches through the openings in the tube A, so that they will catch over the edge of the disk $h$.

When the implement is thus "set" and held in a suspended state, it will be seen that a fish or animal in nibbling at the bait will draw down the rod E, and consequently the disk $h$, and thereby free the hooks C, which will be immediately, under the action of the spring $e$, forced down to the position shown in red, fig. 1, so as to penetrate the head of the fish or animal and firmly secure it.

The small spring $i$ is quite weak compared with the spring $e$, as the former should admit of the hooks C being readily sprung or freed from the disk $h$, while the spring $e$ should be sufficiently strong to force down the hooks C with considerable power, in order to hold the fish or animal securely.

Having thus described my invention, I claim as new, and desire to secure by Letters Patent—

The tube A, with the hooks C pivoted to it and provided with the pinions $c$ and catches $j\ j$, in combination with the internal tube D, provided with the spring $e$ and rack $d$ in which the pinions $c$ gear, and the rod E, provided with the cup disk $h$ and spring $i$, all arranged to operate substantially in the manner as and for the purpose set forth.

JACOB KING, JR.

Witnesses:
WM. F. MCNAMARA,
ALEX F. ROBERTS.